(12) United States Patent
Chen et al.

(10) Patent No.: US 8,325,269 B2
(45) Date of Patent: Dec. 4, 2012

(54) IMAGE CAPTURING LENS SYSTEM

(75) Inventors: Chun Shan Chen, Taichung (TW); Tsung Han Tsai, Taichung (TW); Dung Yi Hsieh, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 438 days.

(21) Appl. No.: 12/780,465

(22) Filed: May 14, 2010

(65) Prior Publication Data

US 2011/0157453 A1 Jun. 30, 2011

(30) Foreign Application Priority Data

Dec. 30, 2009 (TW) .............................. 98145789 A

(51) Int. Cl.
*H04N 5/225* (2006.01)
(52) U.S. Cl. ....................................... 348/360; 359/715
(58) Field of Classification Search .................. 348/335, 348/340, 360; 359/715, 734
See application file for complete search history.

(56) References Cited

U.S. PATENT DOCUMENTS

| 7,515,351 | B2 | 4/2009 | Chen et al. | |
|---|---|---|---|---|
| 2011/0075271 | A1* | 3/2011 | Tang et al. | 359/715 |
| 2012/0033124 | A1* | 2/2012 | Tsai | 348/335 |
| 2012/0170139 | A1* | 7/2012 | Chen et al. | 359/715 |
| 2012/0206641 | A1* | 8/2012 | Baba | 348/360 |

FOREIGN PATENT DOCUMENTS

JP 2005-024969 A 1/2005

* cited by examiner

*Primary Examiner* — Tuan Ho
(74) *Attorney, Agent, or Firm* — Morris, Manning & Martin, LLP; Tim Tingkang Xia, Esq.

(57) ABSTRACT

This invention provides an image capturing lens system comprising, in order from an object side to an image side: a first lens element with negative refractive power having a concave image-side surface; a second lens element with positive refractive power having a convex image-side surface; a third lens element with positive refractive power, at least one of the two surfaces thereof being aspheric; a fourth lens element with negative refractive power, both the two surfaces thereof being aspheric; and a stop disposed between the first and third lens elements, wherein there are four lens elements with refractive power.

25 Claims, 21 Drawing Sheets

| TABLE 1 | | | | | | |
|---|---|---|---|---|---|---|
| (Embodiment 1) | | | | | | |
| f = 3.56mm, Fno = 2.05, HFOV = 38.3 deg. | | | | | | |
| Surface # | | Curvature Radius | Thickness | Material | Index | Abbe # | Focal length |
| 0 | Object | Plano | Infinity | | | | |
| 1 | Lens 1 | 4.45970 (ASP) | 1.263 | Plastic | 1.632 | 23.4 | -6.97 |
| 2 | | 1.97295 (ASP) | 0.695 | | | | |
| 3 | Stop | Plano | 0.240 | | | | |
| 4 | Lens 2 | -3.47370 (ASP) | 1.611 | Plastic | 1.544 | 55.9 | 7.44 |
| 5 | | -2.17474 (ASP) | 0.100 | | | | |
| 6 | Lens 3 | 3.37010 (ASP) | 3.000 | Plastic | 1.544 | 55.9 | 2.43 |
| 7 | | -1.49690 (ASP) | 0.222 | | | | |
| 8 | Lens 4 | -0.96094 (ASP) | 0.842 | Plastic | 1.632 | 23.4 | -3.85 |
| 9 | | -2.12840 (ASP) | 0.700 | | | | |
| 10 | Filter | Plano | 0.300 | Glass | 1.517 | 64.2 | - |
| 11 | | Plano | 0.600 | | | | |
| 12 | Cover-glass | Plano | 0.550 | Glass | 1.517 | 64.2 | - |
| 13 | | Plano | 0.598 | | | | |
| 14 | Image | Plano | | | | | |

Fig.6

| TABLE 2 | | | | |
|---|---|---|---|---|
| Aspheric Coefficients | | | | |
| Surface # | 1 | 2 | 4 | 5 |
| k = | 3.01157E+00 | 2.24122E+00 | -2.24272E+01 | 2.69871E-01 |
| A4 = | 1.34770E-02 | 3.76007E-02 | -6.22201E-02 | -1.09664E-02 |
| A6 = | -1.48894E-03 | 5.49603E-03 | 4.76625E-02 | -4.41497E-03 |
| A8 = | 4.32605E-04 | -5.89183E-03 | -3.69209E-02 | 2.84393E-03 |
| A10= | -3.05844E-05 | 1.23969E-02 | 1.52458E-02 | -8.46356E-04 |
| Surface # | 6 | 7 | 8 | 9 |
| k = | -2.41902E+00 | -2.95819E+00 | -1.69615E+00 | -2.70136E+00 |
| A4 = | -3.90445E-03 | -1.62381E-02 | 4.62657E-02 | 3.65228E-02 |
| A6 = | 1.20050E-03 | 5.60059E-03 | -8.57982E-03 | 1.67758E-03 |
| A8 = | -2.19117E-04 | -7.69418E-04 | 8.91551E-04 | -1.02457E-03 |
| A10= | 5.26930E-06 | 4.14396E-05 | -2.90879E-05 | 8.04336E-05 |

Fig.7

| TABLE 3 | | | | | | |
|---|---|---|---|---|---|---|
| (Embodiment 2) | | | | | | |
| f = 3.04mm, Fno = 2.05, HFOV = 37.6 deg. | | | | | | |
| Surface # | | Curvature Radius | Thickness | Material | Index | Abbe # | Focal length |
| 0 | Object | Plano | Infinity | | | | |
| 1 | Lens 1 | 3.69760 (ASP) | 0.650 | Plastic | 1.632 | 23.4 | -20.33 |
| 2 | | 2.67570 (ASP) | 2.457 | | | | |
| 3 | Stop | Plano | 0.376 | | | | |
| 4 | Lens 2 | -1.51117 (ASP) | 0.994 | Plastic | 1.544 | 55.9 | 23.03 |
| 5 | | -1.66116 (ASP) | 0.070 | | | | |
| 6 | Lens 3 | 2.55242 (ASP) | 2.595 | Plastic | 1.544 | 55.9 | 1.77 |
| 7 | | -0.99013 (ASP) | 0.163 | | | | |
| 8 | Lens 4 | -0.70624 (ASP) | 1.041 | Plastic | 1.632 | 23.4 | -2.68 |
| 9 | | -1.90208 (ASP) | 0.700 | | | | |
| 10 | Filter | Plano | 0.300 | Glass | 1.517 | 64.2 | - |
| 11 | | Plano | 0.100 | | | | |
| 12 | Cover-glass | Plano | 0.300 | Glass | 1.517 | 64.2 | - |
| 13 | | Plano | 0.778 | | | | |
| 14 | Image | Plano | | | | | |

Fig.8

| TABLE 4 | | | | |
|---|---|---|---|---|
| Aspheric Coefficients | | | | |
| Surface # | 1 | 2 | 4 | 5 |
| k = | -1.00000E+00 | -1.31876E+00 | -1.64708E-03 | 1.00000E-01 |
| A4 = | 5.23239E-03 | 1.41220E-02 | 2.21545E-02 | -3.51221E-03 |
| A6 = | 1.64851E-03 | 1.58113E-03 | -7.94860E-02 | 2.46171E-03 |
| A8 = | 5.97304E-05 | 2.28460E-03 | 1.09682E-01 | 3.85563E-03 |
| A10= | -8.28701E-06 | -4.11821E-04 | -8.85094E-02 | -8.44867E-04 |
| A12= | | | -2.58451E-09 | |
| A14= | | | -3.54848E-10 | |
| Surface # | 6 | 7 | 8 | 9 |
| k = | -4.21972E+00 | -3.43266E+00 | -2.36105E+00 | -3.07037E-01 |
| A4 = | 8.63497E-03 | -3.90862E-02 | 2.44547E-02 | 1.12263E-01 |
| A6 = | 8.71581E-04 | 1.28728E-02 | -6.47822E-03 | -1.56203E-02 |
| A8 = | -1.18744E-03 | -2.17959E-03 | 1.85748E-03 | 2.54469E-03 |
| A10= | 1.42296E-04 | 1.51432E-04 | -1.52421E-04 | -3.34893E-05 |

Fig.9

| TABLE 5 | | | | | | | |
|---|---|---|---|---|---|---|---|
| (Embodiment 3) | | | | | | | |
| f = 3.47mm, Fno = 2.05, HFOV= 37.6 deg. | | | | | | | |
| Surface # | | Curvature Radius | Thickness | Material | Index | Abbe # | Focal length |
| 0 | Object | Plano | Infinity | | | | |
| 1 | Lens 1 | 8.32910 (ASP) | 2.258 | Plastic | 1.632 | 23.4 | -5.97 |
| 2 | | 2.32441 (ASP) | 0.515 | | | | |
| 3 | Stop | Plano | 0.168 | | | | |
| 4 | Lens 2 | -6.30470 (ASP) | 1.988 | Plastic | 1.544 | 55.9 | 5.18 |
| 5 | | -2.16298 (ASP) | 0.100 | | | | |
| 6 | Lens 3 | 2.54547 (ASP) | 1.696 | Plastic | 1.544 | 55.9 | 2.76 |
| 7 | | -2.79545 (ASP) | 0.300 | | | | |
| 8 | Lens 4 | -1.02185 (ASP) | 0.474 | Plastic | 1.632 | 23.4 | -3.64 |
| 9 | | -2.16752 (ASP) | 1.000 | | | | |
| 10 | Filter | Plano | 0.300 | Glass | 1.517 | 64.2 | - |
| 11 | | Plano | 0.500 | | | | |
| 12 | Cover-glass | Plano | 0.400 | Glass | 1.517 | 64.2 | - |
| 13 | | Plano | 0.588 | | | | |
| 14 | Image | Plano | | | | | |

Fig.10

| TABLE 6 | | | | |
|---|---|---|---|---|
| Aspheric Coefficients | | | | |
| Surface # | 1 | 2 | 4 | 5 |
| k = | -1.22929E+00 | -4.13370E-01 | -9.51730E+01 | -2.58390E-01 |
| A4 = | 7.36641E-03 | 6.91936E-02 | -3.98539E-02 | -2.09359E-02 |
| A6 = | -3.20003E-04 | 7.45591E-02 | 5.01614E-02 | -4.77039E-03 |
| A8 = | 5.65460E-05 | -8.32643E-02 | -4.69665E-02 | 2.11815E-03 |
| A10= | -3.50222E-06 | 8.27780E-02 | 2.06163E-02 | -7.55211E-04 |
| Surface # | 6 | 7 | 8 | 9 |
| k = | -9.94427E-01 | -1.28982E+01 | -2.84214E+00 | -6.50454E+00 |
| A4 = | 3.45122E-04 | -2.01181E-02 | 5.65928E-02 | 1.10103E-01 |
| A6 = | -4.49102E-04 | 1.15342E-02 | -1.28140E-02 | -2.06856E-02 |
| A8 = | 3.51308E-04 | -1.83989E-03 | 1.82551E-03 | 2.36536E-03 |
| A10= | -7.10951E-05 | 1.02611E-04 | -9.72159E-05 | -1.59196E-04 |

Fig.11

| TABLE 7 | | | | | | |
|---|---|---|---|---|---|---|
| (Embodiment 4) | | | | | | |
| f = 3.46mm, Fno = 2.05, HFOV = 37.6 deg. | | | | | | |
| Surface # | | Curvature Radius | Thickness | Material | Index | Abbe # | Focal length |
| 0 | Object | Plano | Infinity | | | | |
| 1 | Lens 1 | 6.41730 (ASP) | 2.204 | Plastic | 1.632 | 23.4 | -5.84 |
| 2 | | 2.03180 (ASP) | 0.543 | | | | |
| 3 | Stop | Plano | 0.238 | | | | |
| 4 | Lens 2 | -3.43940 (ASP) | 1.337 | Plastic | 1.544 | 55.9 | 8.68 |
| 5 | | -2.26329 (ASP) | 0.100 | | | | |
| 6 | Lens 3 | 2.55386 (ASP) | 2.257 | Plastic | 1.544 | 55.9 | 2.21 |
| 7 | | -1.56346 (ASP) | 0.300 | | | | |
| 8 | Lens 4 | -0.83428 (ASP) | 0.400 | Plastic | 1.632 | 23.4 | -3.25 |
| 9 | | -1.66667 (ASP) | 1.000 | | | | |
| 10 | Filter | Plano | 0.300 | Glass | 1.517 | 64.2 | - |
| 11 | | Plano | 0.500 | | | | |
| 12 | Cover-glass | Plano | 0.400 | Glass | 1.517 | 64.2 | - |
| 13 | | Plano | 0.587 | | | | |
| 14 | Image | Plano | | | | | |

Fig.12

| TABLE 8 | | | | |
|---|---|---|---|---|
| Aspheric Coefficients | | | | |
| Surface # | 1 | 2 | 4 | 5 |
| k = | -3.21526E-01 | -3.06892E-01 | -2.60768E+01 | 1.03092E+00 |
| A4 = | 6.88962E-03 | 6.97192E-02 | -6.64666E-02 | -9.96022E-03 |
| A6 = | -2.31790E-04 | 6.78486E-02 | 5.17939E-02 | -7.13975E-03 |
| A8 = | 6.16342E-05 | -7.13760E-02 | -4.57549E-02 | 4.57847E-03 |
| A10= | -2.86347E-06 | 8.10686E-02 | 1.33159E-02 | -1.43240E-03 |
| Surface # | 6 | 7 | 8 | 9 |
| k = | -1.89328E+00 | -3.83547E+00 | -2.70863E+00 | -7.28706E+00 |
| A4 = | -4.75885E-04 | -1.62995E-02 | 3.02616E-02 | 6.60488E-02 |
| A6 = | 1.15449E-03 | 6.15911E-03 | -5.80575E-03 | -9.20474E-03 |
| A8 = | -2.25420E-04 | -5.32236E-04 | 1.33493E-03 | 1.71425E-03 |
| A10= | 2.94593E-06 | 2.95537E-06 | -1.15455E-04 | -1.93797E-04 |

Fig.13

| TABLE 9 | | | | | | |
|---|---|---|---|---|---|---|
| (Embodiment 5) | | | | | | |
| f = 4.59mm, Fno = 2.40, HFOV = 30.1 deg. | | | | | | |
| Surface # | | Curvature Radius | Thickness | Material | Index | Abbe # | Focal length |
| 0 | Object | Plano | Infinity | | | | |
| 1 | Lens 1 | 2.25471 (ASP) | 0.701 | Plastic | 1.583 | 30.2 | -6.86 |
| 2 | | 1.27683 (ASP) | 1.483 | | | | |
| 3 | Stop | Plano | 0.645 | | | | |
| 4 | Lens 2 | 12.50000 (ASP) | 1.128 | Plastic | 1.544 | 55.9 | 5.19 |
| 5 | | -3.53250 (ASP) | 0.070 | | | | |
| 6 | Lens 3 | 2.96148 (ASP) | 1.369 | Plastic | 1.544 | 55.9 | 3.67 |
| 7 | | -5.13430 (ASP) | 0.400 | | | | |
| 8 | Lens 4 | -1.53524 (ASP) | 0.506 | Plastic | 1.632 | 23.4 | -4.03 |
| 9 | | -4.36610 (ASP) | 1.500 | | | | |
| 10 | Filter | Plano | 0.300 | Glass | 1.517 | 64.2 | - |
| 11 | | Plano | 0.500 | | | | |
| 12 | Cover-glass | Plano | 0.400 | Glass | 1.517 | 64.2 | - |
| 13 | | Plano | 0.976 | | | | |
| 14 | Image | Plano | | | | | |

Fig.14

| TABLE 10 ||||
|---|---|---|---|---|
| Aspheric Coefficients |||||
| Surface # | 1 | 2 | 4 | 5 |
| k   = | -2.12533E+00 | -1.00782E+00 | -1.00000E+00 | -1.19337E+00 |
| A4 = | 1.01854E-02 | 2.73881E-02 | 2.83871E-03 | -1.50860E-02 |
| A6 = | -4.52020E-03 | 3.17349E-03 | -1.11056E-03 | -6.28457E-04 |
| A8 = | 5.81141E-04 | -2.93252E-03 | 3.60784E-04 | 5.96344E-04 |
| A10= | -5.01728E-05 | 2.20624E-03 | -1.30039E-04 | -1.67398E-04 |
| Surface # | 6 | 7 | 8 | 9 |
| k   = | -1.14573E+00 | -3.16800E+01 | -3.80354E+00 | -1.69021E+01 |
| A4 = | -2.03552E-04 | -2.41270E-02 | 5.80769E-02 | 1.18002E-01 |
| A6 = | -1.47004E-03 | 1.07672E-02 | -1.64670E-02 | -2.09166E-02 |
| A8 = | 6.21231E-04 | -1.98405E-03 | 2.16726E-03 | 1.03353E-03 |
| A10= | -1.40744E-04 | 7.46110E-05 | -1.29076E-04 | 6.90710E-05 |

Fig.15

| TABLE 11 | | | | | |
|---|---|---|---|---|---|
| | Embodiment 1 | Embodiment 2 | Embodiment 3 | Embodiment 4 | Embodiment 5 |
| f | 3.56 | 3.04 | 3.47 | 3.46 | 4.59 |
| Fno | 2.05 | 2.05 | 2.05 | 2.05 | 2.40 |
| HFOV | 38.3 | 37.6 | 37.6 | 37.6 | 30.1 |
| V2-V1 | 32.5 | 32.5 | 32.5 | 32.5 | 25.7 |
| V3-V4 | 32.5 | 32.5 | 32.5 | 32.5 | 32.5 |
| f/f1 | -0.51 | -0.15 | -0.58 | -0.59 | -0.67 |
| f/f3 | 1.47 | 1.72 | 1.26 | 1.57 | 1.25 |
| f3/f4 | -0.63 | -0.66 | -0.76 | -0.68 | -0.91 |
| R4/f | -0.61 | -0.55 | -0.62 | -0.65 | -0.77 |
| (R5+R6)/(R5-R6) | 0.38 | 0.44 | -0.05 | 0.24 | -0.27 |
| T12/f | 0.26 | 0.93 | 0.20 | 0.23 | 0.46 |
| (T34/f)*100 | 6.24 | 5.36 | 8.65 | 8.67 | 8.71 |
| SL/TTL | 0.81 | 0.70 | 0.72 | 0.72 | 0.78 |
| TTL/ImgH | 3.73 | 4.50 | 3.86 | 3.81 | 3.74 |

Fig.16

IMAGE CAPTURING LENS SYSTEM

CROSS-REFERENCE TO RELATED APPLICATIONS

This non-provisional application claims priority under 35 U.S.C. §119(a) on Patent Application No(s). 098145789 filed in Taiwan, R.O.C. on Dec. 30, 2009, the entire contents of which are hereby incorporated by reference.

BACKGROUND OF THE INVENTION

1. Field of the Invention

The present invention relates to an image capturing lens system, and more particularly, to a compact image capturing system used in a portable electronic product.

2. Description of the Prior Art

In recent years, with the popularity of mobile phone cameras, the demand for compact imaging lenses is increasing, and the sensor of a general photographing camera is none other than CCD (charge coupled device) or CMOS device (Complementary Metal Oxide Semiconductor device). Furthermore, as advances in semiconductor manufacturing technology have allowed the pixel size of sensors to be reduced, and the resolution of compact imaging lenses has gradually increased, there is an increasing demand for compact imaging lenses featuring better image quality.

In a conventional PC camera or a camera lens with a wide field of view, the lens assembly is usually arranged in a manner that the front lens group has negative refractive power, and the rear lens group has positive refractive power. Such an arrangement for the purpose of obtaining a wide field of view forms the so-called inverse telephoto structure. U.S. Pat. No. 7,515,351 shows an example of said arrangement, disclosing a lens assembly comprising five lens elements with a negative front lens group and a positive rear lens group, wherein the third and fourth lens elements are adhered by means of two glass spherical surface lenses to form a doublet so as to correct the chromatic aberration. Such an arrangement of optical elements, however, has the following disadvantages: (1) the degree of freedom in arranging the lens system is curtailed due to the employment of excess number of glass spherical surface lenses; thus, the total track length of the system cannot be reduced easily; (2) the process of adhering the glass lenses together is complicated, posing difficulties in manufacture.

Therefore, a need exists in the art for an image capturing lens system that is applicable to electronic products, employs simple manufacturing process and maintains a moderate total track length.

SUMMARY OF THE INVENTION

The present invention provides an image capturing lens system comprising, in order from an object side to an image side: a first lens element with negative refractive power having a concave image-side surface; a second lens element with positive refractive power having a convex image-side surface; a third lens element with positive refractive power, at least one of the object-side and image-side surfaces thereof being aspheric; a fourth lens element with negative refractive power, both of the object-side and image-side surfaces thereof being aspheric; and a stop disposed between the first lens element and the third lens element. In this image capturing lens system, there are four lens elements with refractive power, the radius of curvature of the image-side surface of the second lens element is R4, the focal length of the image capturing lens system is f, the distance near the optical axis between the third lens element and the fourth lens element is T34, and R4, f and T34 satisfy the following relations: $-2.0<R4/f<-0.2$; $0.5<(T34/f)*100<20.0$.

Furthermore, the present invention provides an image capturing lens system comprising, in order from an object side to an image side: a first lens element with negative refractive power having a convex object-side surface and a concave image-side surface; a second lens element with positive refractive power having a convex image-side surface; a third lens element with positive refractive power, at least one of the object-side and image-side surfaces thereof being aspheric; a fourth lens element with negative refractive power, at least one of the object-side and image-side surfaces thereof having at least one inflection point; and a stop disposed between the first lens element and the second lens element. In this image capturing lens system, there are four lens elements with refractive power, the focal length of the image capturing lens system is f, the focal length of the third lens element is f3, the distance near the optical axis between the third lens element and the fourth lens element is T34, and f, f3 and T34 satisfy the following relations: $0.80<f/f3<2.40$; $0.5<(T34/f)*100<20.0$.

Such an arrangement of optical elements can effectively correct aberrations to improve image quality of the system; at the same time, the total track length can be reduced and a wide field of view can be achieved for the image capturing lens system.

In an image capturing lens system of the present invention, the first lens element has negative refractive power, which helps to enlarge the field of view of the system; the second lens element has positive refractive power, which allows the aberrations produced by the first lens element with negative refractive power to be favorably corrected; the third lens element has positive refractive power, which provides the main refractive power of the system and allows the total track length of the system to be favorably reduced; the fourth lens element has negative refractive power, which allows the chromatic aberration of the system to be favorably corrected.

In an image capturing lens system of the present invention, the first lens element has a concave image-side surface, which allows the field of view of the system to be favorably enlarged; moreover, when the first lens element is a meniscus lens element having a convex object-side surface and a concave image-side surface, a better balance between enlarging the field of view and correcting aberrations of the system can be favorably achieved. The second lens element may be a meniscus lens element having a concave object-side surface and a convex image-side surface, or may be a bi-convex lens element. When the second lens element is a meniscus lens element, the astigmatism of the system can be corrected favorably; when the second lens element is a bi-convex lens element, the refractive power thereof can be distributed favorably, which further allows the refractive power of the third lens element to be favorably distributed, thereby effectively reducing the sensitivity of the system. The third lens element may be a bi-convex lens element, which allows the refractive power thereof to be favorably distributed, thereby reducing the total track length of the system. The fourth lens element may be a meniscus lens element having a concave object-side surface and a convex image-side surface, which allows the astigmatism of the system to be corrected favorably, thereby improving image quality of the system.

In an image capturing lens system of the present invention, the stop may be disposed between the first lens element and the second lens element, or between the second lens element and the third lens element. For optical systems with a wide field of view, the correction of distortion and chromatic aberration of magnification is especially necessary, and the correction can be made by placing the stop in a location where the refractive power of the optical system is balanced. Therefore, in an image capturing lens system of the present invention, the stop is disposed between the first lens element and the third lens element so as to achieve a good balance between reducing the total track length and obtaining a wide field of view for the system. Such an arrangement of the stop also effectively reduces the sensitivity of the system. When the stop is disposed between the first lens element and the second lens element, the total track length of the image capturing lens system can be further reduced.

BRIEF DESCRIPTION OF THE DRAWINGS

FIG. 6 is TABLE 1 which lists the optical data of the first embodiment.

FIG. 7 is TABLE 2 which lists the aspheric surface data of the first embodiment.

FIG. 8 is TABLE 3 which lists the optical data of the second embodiment.

FIG. 9 is TABLE 4 which lists the aspheric surface data of the second embodiment.

FIG. 10 is TABLE 5 which lists the optical data of the third embodiment.

FIG. 11 is TABLE 6 which lists the aspheric surface data of the third embodiment.

FIG. 12 is TABLE 7 which lists the optical data of the fourth embodiment.

FIG. 13 is TABLE 8 which lists the aspheric surface data of the fourth embodiment.

FIG. 14 is TABLE 9 which lists the optical data of the fifth embodiment.

FIG. 15 is TABLE 10 which lists the aspheric surface data of the fifth embodiment.

FIG. 16 is TABLE 11 which lists the data of the respective embodiments resulting from the equations.

DETAILED DESCRIPTION OF THE PREFERRED EMBODIMENTS

Figure 1A:
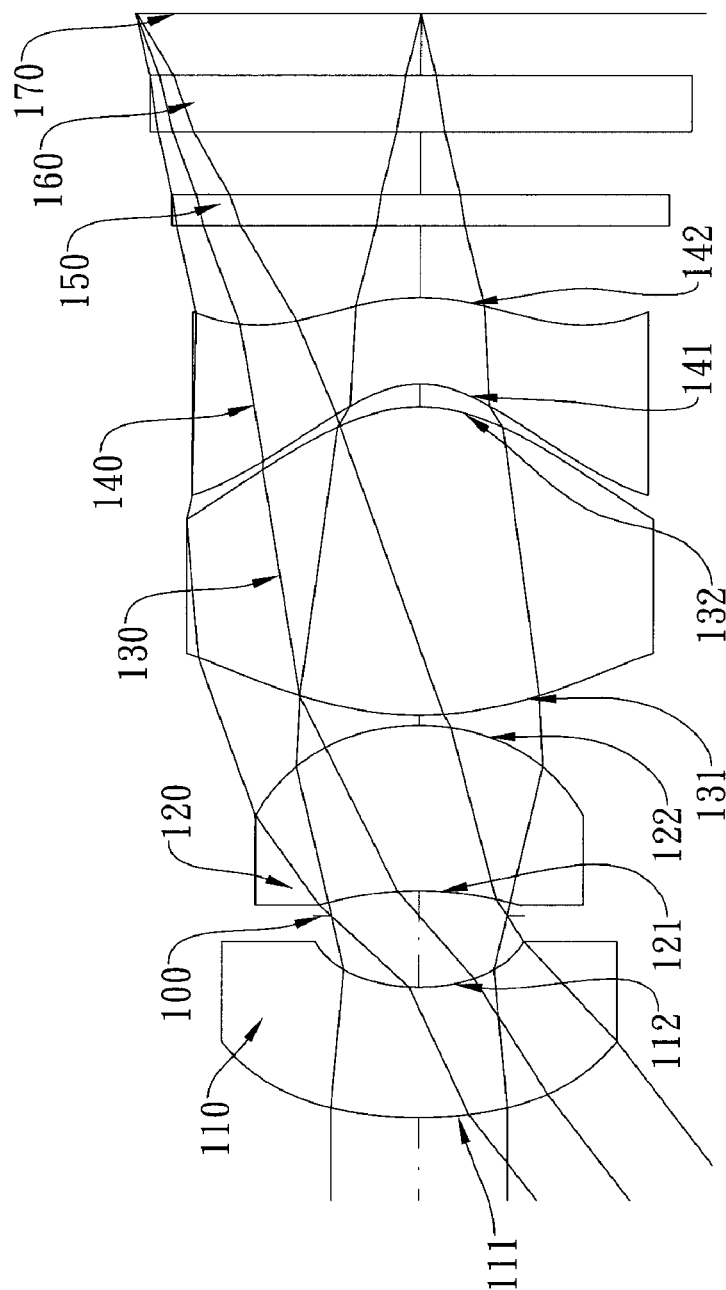
FIG. 1A shows an image capturing lens system in accordance with a first embodiment of the present invention.

The present invention provides an image capturing lens system comprising, in order from an object side to an image side: a first lens element with negative refractive power having a concave image-side surface; a second lens element with positive refractive power having a convex image-side surface; a third lens element with positive refractive power, at least one of the object-side and image-side surfaces thereof being aspheric; a fourth lens element with negative refractive power, both of the object-side and image-side surfaces thereof being aspheric; and a stop disposed between the first lens element and the third lens element, wherein there are four lens elements with refractive power, the radius of curvature of the image-side surface of the second lens element is R4, the focal length of the image capturing lens system is f, the distance near the optical axis between the third lens element and the fourth lens element is T34, and R4, f and T3 satisfy the following relations: $-2.0<R4/f<-0.2$; $0.5<(T34/f)*100<20.0$.

When the relation of $-2.0<R4/f<-0.2$ is satisfied, the positive refractive power of the second lens element can be distributed favorably, which further allows the refractive power of the third lens element to be favorably distributed, thereby effectively reducing the sensitivity of the system; also, the aberrations produced by the first lens element can be effectively corrected. Preferably, R4 and f satisfy the following relation: $-1.0<R4/f<-0.5$. When the relation of $0.5<(T34/f)*100<20.0$ is satisfied, the high order aberration of the system can be favorably corrected so that image quality can be improved. Preferably, T34 and f satisfy the following relation: $4.0<(T34/f)*100<12.0$.

In the aforementioned image capturing lens system, preferably, both of the object-side and image-side surfaces of the third lens element are convex; this allows the refractive power of the third lens element to be favorably distributed, thereby reducing the total track length of the system. Preferably, both of the object-side and image-side surfaces of the third lens element are aspheric; this allows more design parameters for the system since aspheric surfaces can be easily made into non-spherical profiles. Furthermore, it will reduce aberrations and the total number of the lens elements, so that the total track length of the system can be reduced effectively and image quality can be improved. Preferably, at least one of the object-side and image-side surfaces of the fourth lens element has at least one inflection point; this allows the angle of incident light onto the photo sensor from the off-axis field to be effectively reduced, and the off-axis aberration can be further corrected.

In the aforementioned image capturing lens system, preferably, the first lens element has a convex object-side surface; this allows a better balance between enlarging the field of view and correcting aberrations of the system. Preferably, the fourth lens element has a concave object-side surface and a convex image-side surface; this allows the astigmatism of the system to be corrected favorably, thereby improving image quality of the system.

In the aforementioned image capturing lens system, preferably, at least three of the lens elements are made of plastic, and their object-side and image-side surfaces are both aspheric. Plastic is favorable for the production of aspheric lenses; moreover, the production cost can be effectively reduced.

In the aforementioned image capturing lens system, the focal length of the system is f, the focal length of the third lens element is f3, and preferably, f and f3 satisfy the following relation: $0.80<f/f3<2.40$. When this relation is satisfied, the refractive power of the third lens element will have a more balanced distribution. As a result, the total track length of the system can be effectively reduced, and the high order spherical aberration can be prevented from becoming too large, thereby improving image quality of the system. Preferably, f and f3 satisfy the following relation: $1.25<f/f3<1.75$.

In the aforementioned image capturing lens system, the focal length of the system is f, the focal length of the first lens element is f1, and preferably, f and f1 satisfy the following relation: $-1.00<f/f1<-0.30$. When this relation is satisfied, a better balance between enlarging the field of view and reducing the total track length of the system can be favorably achieved.

In the aforementioned image capturing lens system, the Abbe number of the third lens element is V3, the Abbe number of the fourth lens element is V4, and preferably, V3 and V4 satisfy the following relation: $23.0<V3-V4<46.0$. When this relation is satisfied, it is favorable to provide the system with improved ability to correct chromatic aberration. Preferably, V3 and V4 satisfy the following relation: $30.0<V3-V4<40.0$.

In the aforementioned image capturing lens system, the Abbe number of the first lens element is V1, the Abbe number of the second lens element is V2, and preferably, V1 and V2 satisfy the following relation: $30.0<V2-V1<40.0$. When this relation is satisfied, the chromatic aberration of the system can be favorably corrected.

In the aforementioned image capturing lens system, the stop is disposed between the first lens element and the second lens element, the lens system provides an electronic photo sensor for image projection of an object, the distance near the optical axis between the stop and the electronic photo sensor is SL, the distance near the optical axis between the object-side surface of the first lens element and the electronic photo sensor is TTL, and preferably, SL and TTL satisfy the following relation: $0.65<SL/TTL<0.90$. When this relation is satisfied, a better balance between reducing the total track length and obtaining a wide field of view for the system can be favorably achieved.

In the aforementioned image capturing lens system, the distance near the optical axis between the first lens element and the second lens element is T12, the focal length of the system is f, and preferably, T12 and f satisfy the following relation: $0.05<T12/f<1.20$. When this relation is satisfied, the high order aberration of the system can be favorably corrected so that image quality can be improved; also, the lens elements in the system can be placed closely together so that the total track length thereof can be favorably reduced. Preferably, T12 and f satisfy the following relation: $0.10<T12/f<0.50$.

In the aforementioned image capturing lens system, the focal length of the third lens element is f3, the focal length of the fourth lens element is f4, and preferably, f3 and f4 satisfy the following relation: $-1.00<f3/f4<-0.50$. When this relation is satisfied, the refractive power of both the third lens element and the fourth lens element will have a more balanced distribution, thereby allowing the chromatic aberration and high order aberration of the system to be favorably corrected.

In the aforementioned image capturing lens system, the respective radii of curvature of the object-side and image-side surfaces of the third lens element are R5 and R6, and preferably, they satisfy the following relation: $-0.50<(R5+R6)/(R5-R6)<0.70$. When this relation is satisfied, the spherical aberration of the system can be favorably corrected.

In the aforementioned image capturing lens system, an electronic photo sensor is provided for image projection of an object, the distance near the optical axis between the object-side surface of the first lens element and the electronic photo sensor is TTL, half of the diagonal length of the effective pixel area of the electronic photo sensor is ImgH, and preferably, TTL and ImgH satisfy the following relation: $TTL/ImgH<5.0$. When this relation is satisfied, the system can favorably remain compact so that it can be installed in a portable electronic product.

Furthermore, the present invention provides an image capturing lens system comprising, in order from an object side to an image side: a first lens element with negative refractive power having a convex object-side surface and a concave image-side surface; a second lens element with positive refractive power having a convex image-side surface; a third lens element with positive refractive power, at least one of the object-side and image-side surfaces thereof being aspheric; a fourth lens element with negative refractive power, at least one of the object-side and image-side surfaces thereof having at least one inflection point; and a stop disposed between the first lens element and the second lens element, wherein there are four lens elements with refractive power, the focal length of the image capturing lens system is f, the focal length of the third lens element is f3, the distance near the optical axis between the third lens element and the fourth lens element is T34, and f, f3 and T34 satisfy the following relations: $0.80<f/f3<2.40$; $0.5<(T34/f)*100<20.0$.

When the relation of $0.80<f/f3<2.40$ is satisfied, the refractive power of the third lens element will have a more balanced distribution. As a result, the total track length of the system can be effectively reduced, and the high order spherical aberration can be prevented from becoming too large, thereby improving image quality of the system. Preferably, f and f3 satisfy the following relation: $1.25<f/f3<1.75$. When the relation of $0.5<(T34/f)*100<20.0$ is satisfied, the high order aberration of the system can be favorably corrected so that image quality can be improved.

In the aforementioned image capturing lens system, preferably, the fourth lens element has a concave object-side surface and a convex image-side surface; this allows the astigmatism of the system to be corrected favorably, thereby improving image quality of the system. Preferably, both of the object-side and image-side surfaces of the third lens element and the fourth lens element are aspheric; this allows more design parameters for the system since aspheric surfaces can be easily made into non-spherical profiles. Furthermore, it will reduce aberrations and the total number of the lens elements, so that the total track length of the system can be reduced effectively and image quality can be improved.

In the aforementioned image capturing lens system, preferably, at least three of the lens elements are made of plastic, and their object-side and image-side surfaces are both aspheric. Plastic is favorable for the production of aspheric lenses; moreover, the production cost can be effectively reduced.

In the aforementioned image capturing lens system, the distance near the optical axis between the first lens element and the second lens element is T12, the focal length of the system is f, and preferably, T12 and f satisfy the following relation: $0.10<T12/f<0.50$. When this relation is satisfied, the high order aberration of the system can be favorably corrected so that image quality can be improved; also, the lens elements in the system can be placed closely together so that the total track length thereof can be favorably reduced.

In the aforementioned image capturing lens system, the Abbe number of the first lens element is V1, the Abbe number of the second lens element is V2, the Abbe number of the third lens element is V3, the Abbe number of the fourth lens element is V4, and preferably, V1, V2, V3 and V4 satisfy the following relations: $30.0<V2-V1<40.0$; $30.0<V3-V4<40.0$. When the above two relations are satisfied, it provides the system with improved ability to correct chromatic aberration.

In the aforementioned image capturing lens system, the respective radii of curvature of the object-side and image-side surfaces of the third lens element are R5 and R6, and they satisfy the following relation: $-0.50<(R5+R6)/(R5-R6)$ <0.70. When this relation is satisfied, the spherical aberration of the system can be favorably corrected.

In an image capturing lens system of the present invention, the lens elements can be made of glass or plastic material. If the lens elements are made of glass, there is more freedom in distributing the refractive power of the system. If plastic material is adopted to produce lens elements, the production cost will be reduced effectively. Additionally, the surfaces of the lens elements can be aspheric and easily made into non-spherical profiles, allowing more design parameter freedom which can be used to reduce aberrations and the total number of the lens elements, so that the total track length of the image capturing system can be reduced effectively.

In an image capturing lens system of the present invention, if a lens element has a convex surface, it means the portion of the surface in proximity to the axis is convex; if a lens element has a concave surface, it means the portion of the surface in proximity to the axis is concave.

Preferred embodiments of the present invention will be described in the following paragraphs by referring to the accompanying drawings.

Figure 1B:
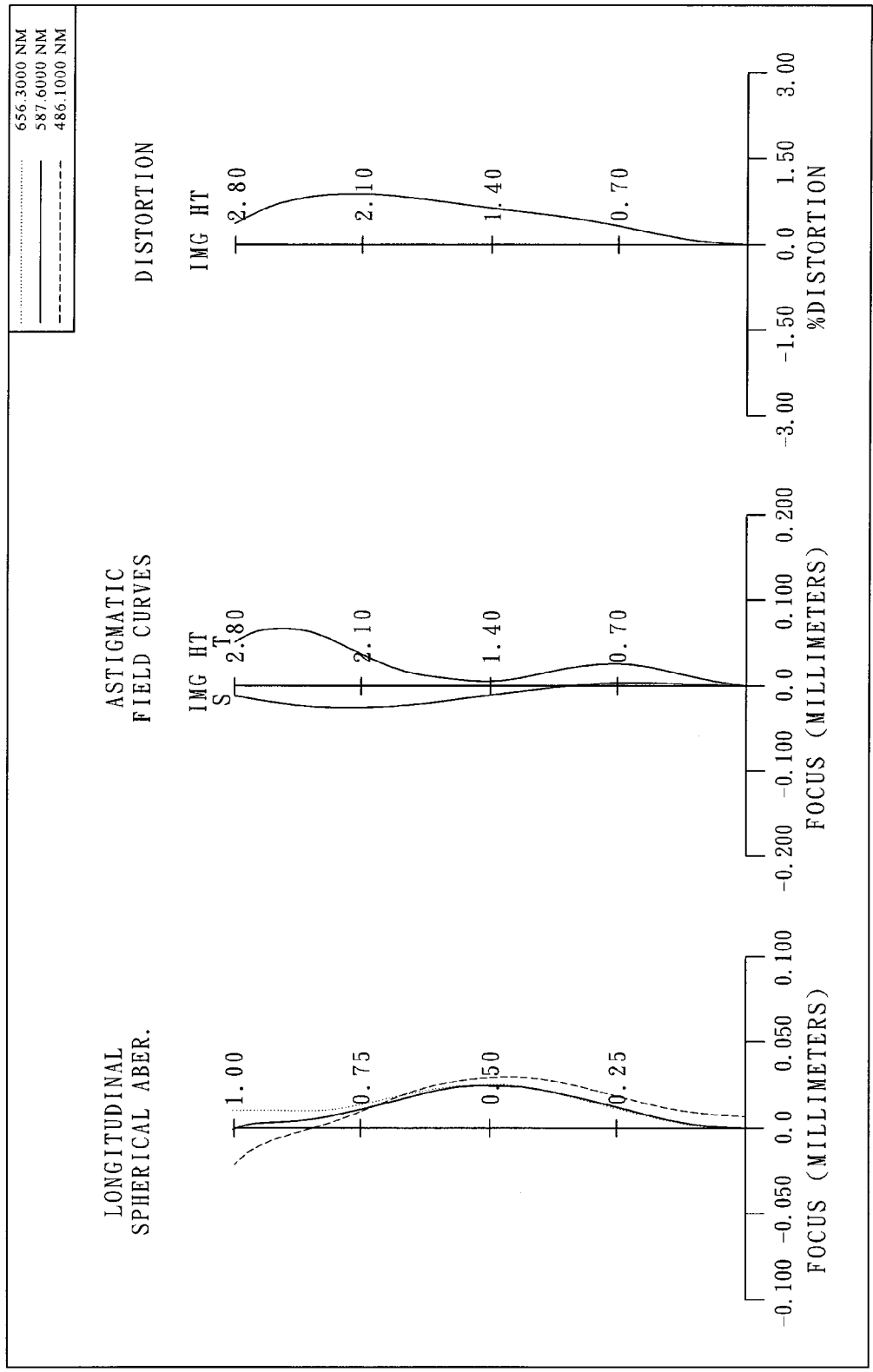
FIG. 1B shows the aberration curves of the first embodiment of the present invention.

FIG. 1A shows an image capturing lens system in accordance with a first embodiment of the present invention, and FIG. 1B shows the aberration curves of the first embodiment of the present invention. The image capturing lens system in the first embodiment mainly comprises four lens elements, in order from an object side to an image side: a plastic first lens element 110 with negative refractive power having a convex object-side surface 111 and a concave image-side surface 112, both of the surfaces 111 and 112 being aspheric; a plastic second lens element 120 with positive refractive power having a concave object-side surface 121 and a convex image-side surface 122, both of the surfaces 121 and 122 being aspheric; a plastic third lens element 130 with positive refractive power having convex object-side and image-side surfaces 131 and 132, both of the surfaces 131 and 132 being aspheric; a plastic fourth lens element 140 with negative refractive power having a concave object-side surface 141 and a convex image-side surface 142, both of the surfaces 141 and 142 being aspheric and having at least one inflection point respectively; and a stop 100 disposed between the first lens element 110 and the second lens element 120. The image capturing lens system further comprises a filter 150 and a cover glass 160 disposed between the image-side surface 142 of the fourth lens element 140 and an image plane 170; the filter 150 and the cover glass 160 are made of glass and have no influence on the focal length of the image capturing lens system.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present image capturing lens system, the focal length of the system is f, and it satisfies the relation: f=3.56 (mm).

In the first embodiment of the present image capturing lens system, the f-number of the system is Fno, and it satisfies the relation: Fno=2.05.

In the first embodiment of the present image capturing lens system, half of the maximum field of view of the system is HFOV, and it satisfies the relation: HFOV=38.3 (degrees).

In the first embodiment of the present image capturing lens system, the Abbe number of the first lens element 110 is V1, the Abbe number of the second lens element 120 is V2, and they satisfy the relation: V2−V1=32.5.

In the first embodiment of the present image capturing lens system, the Abbe number of the third lens element 130 is V3, the Abbe number of the fourth lens element 140 is V4, and they satisfy the relation: V3−V4=32.5.

In the first embodiment of the present image capturing lens system, the focal length of the system is f, the focal length of the first lens element 110 is f1, and they satisfy the relation: f/f1=−0.51.

In the first embodiment of the present image capturing lens system, the focal length of the system is f, the focal length of the third lens element 130 is f3, and they satisfy the relation: f/f3=1.47.

In the first embodiment of the present image capturing lens system, the focal length of the third lens element 130 is f3, the focal length of the fourth lens element 140 is f4, and they satisfy the relation: f3/f4=−0.63.

In the first embodiment of the present image capturing lens system, the radius of curvature of the image-side surface of the second lens element 120 is R4, the focal length of the system is f, and they satisfy the relation: R4/f=−0.61.

In the first embodiment of the present image capturing lens system, the respective radii of curvature of the object-side and image-side surfaces of the third lens element 130 are R5 and R6, and they satisfy the relation: (R5+R6)/(R5−R6)=0.38.

In the first embodiment of the present image capturing lens system, the distance near the optical axis between the first lens element 110 and the second lens element 120 is T12, the focal length of the system is f, and they satisfy the relation: T12/f=0.26.

In the first embodiment of the present image capturing lens system, the distance near the optical axis between the third lens element 130 and the fourth lens element 140 is T34, the focal length of the system is f, and they satisfy the relation: (T34/f)*100=6.24.

In the first embodiment of the present image capturing lens system, an electronic photo sensor for image projection of an object is further provided at the image plane 170, the distance near the optical axis between the stop and the electronic photo sensor is SL, the distance near the optical axis between the object-side surface 111 of the first lens element 110 and the electronic photo sensor is TTL, and they satisfy the relation: SL/TTL=0.81.

In the first embodiment of the present image capturing lens system, an electronic photo sensor for image projection of an object is further provided at the image plane 170, the distance near the optical axis between the object-side surface 111 of the first lens element 110 and the electronic photo sensor is TTL, half of the diagonal length of the effective pixel area of the electronic photo sensor is ImgH, and they satisfy the relation: TTL/ImgH=3.73.

The detailed optical data of the first embodiment is shown in FIG. 6 (TABLE 1), and the aspheric surface data is shown in FIG. 7 (TABLE 2), wherein the units of the radius of curvature, the thickness and the focal length are expressed in mm, and HFOV is half of the maximum field of view.

Figure 2A:
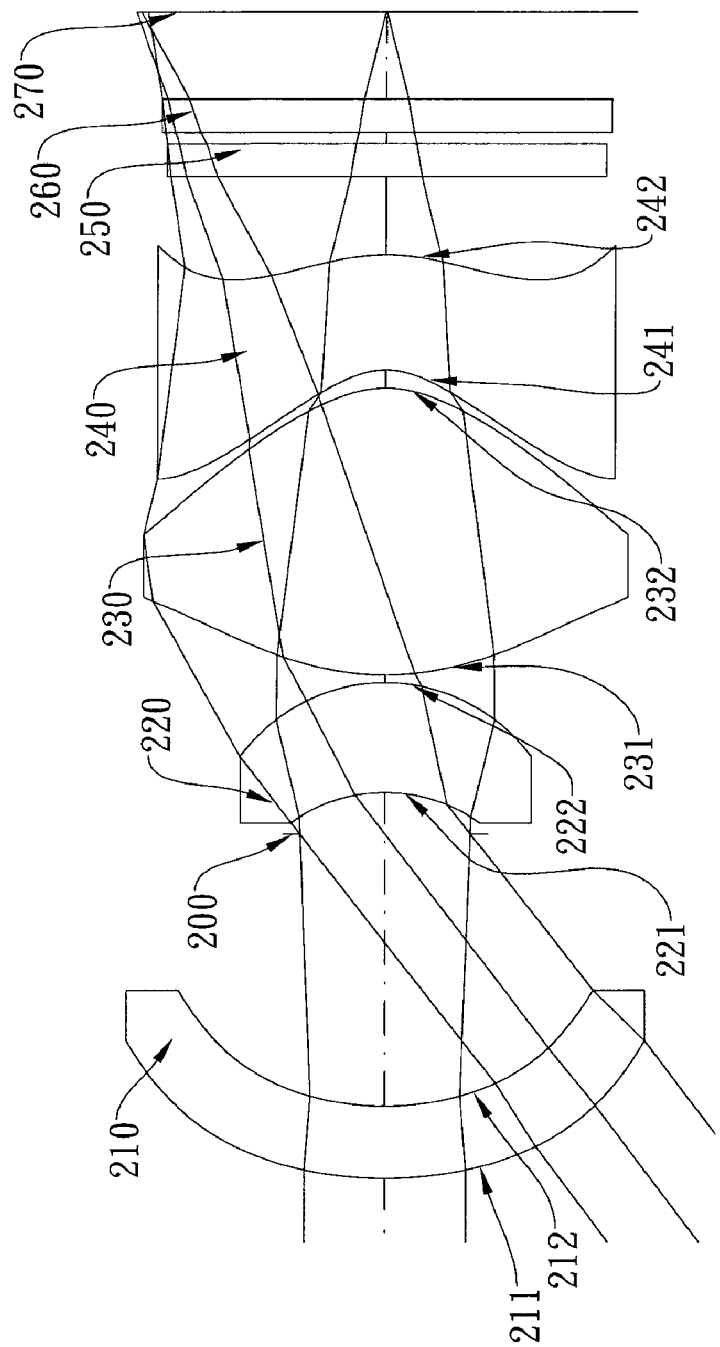
FIG. 2A shows an image capturing lens system in accordance with a second embodiment of the present invention.
Figure 2B:
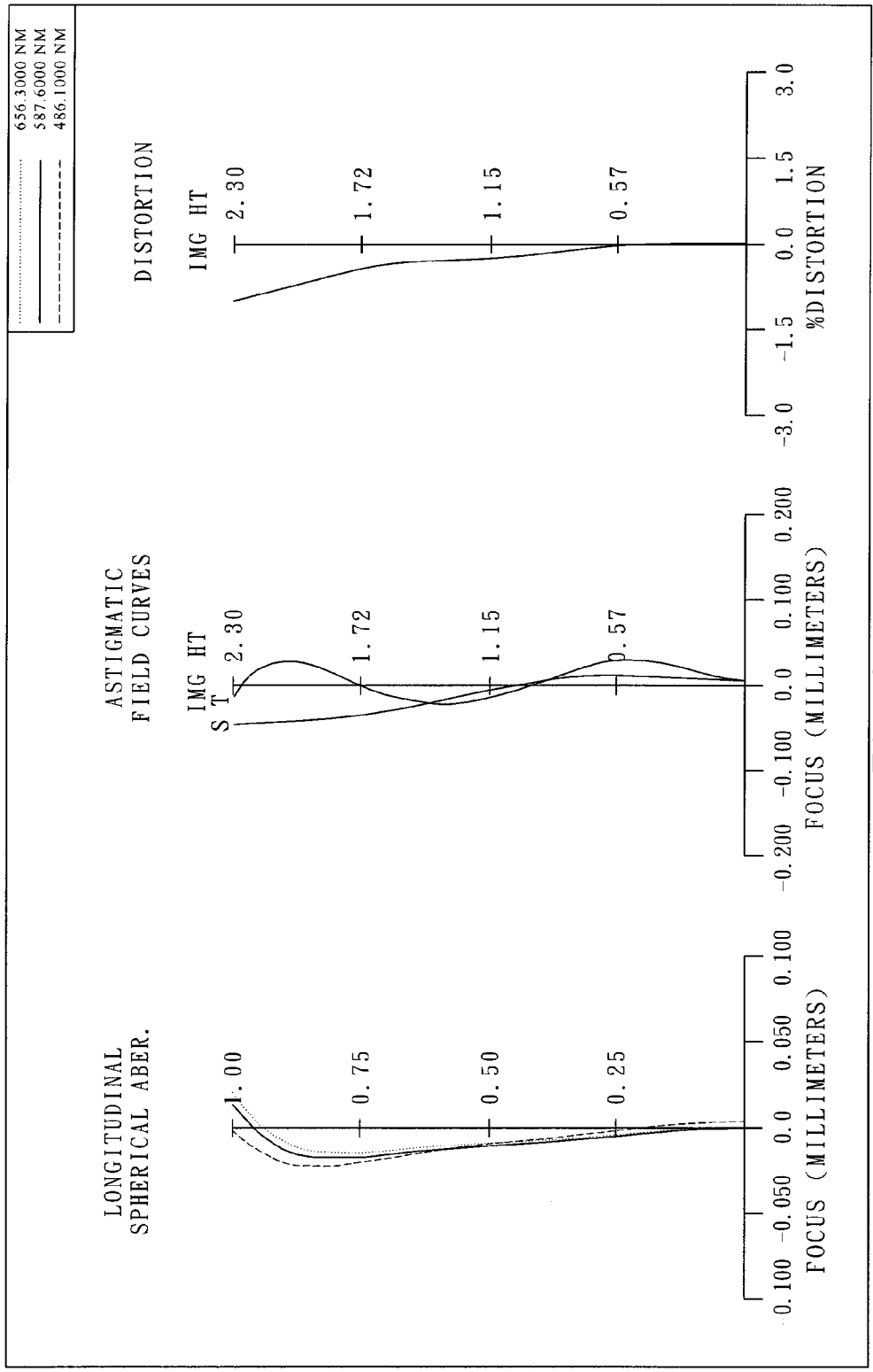
FIG. 2B shows the aberration curves of the second embodiment of the present invention.

FIG. 2A shows an image capturing lens system in accordance with a second embodiment of the present invention, and FIG. 2B shows the aberration curves of the second embodiment of the present invention. The image capturing lens system in the second embodiment mainly comprises four lens elements, in order from an object side to an image side: a plastic first lens element 210 with negative refractive power having a convex object-side surface 211 and a concave image-side surface 212, both of the surfaces 211 and 212 being aspheric; a plastic second lens element 220 with positive refractive power having a concave object-side surface 221 and a convex image-side surface 222, both of the surfaces 221 and 222 being aspheric; a plastic third lens element 230 with positive refractive power having convex object-side and image-side surfaces 231 and 232, both of the surfaces 231 and 232 being aspheric; a plastic fourth lens element 240 with negative refractive power having a concave object-side surface 241 and a convex image-side surface 242, both of the surfaces 241 and 242 being aspheric and having at least one inflection point respectively; and a stop 200 disposed between the first lens element 210 and the second lens element 220. The image capturing lens system further comprises a filter 250 and a cover glass 260 disposed between the image-side surface 242 of the fourth lens element 240 and an image plane 270; the filter 250 and the cover glass 260 are made of glass and have no influence on the focal length of the image capturing lens system.

The equation of the aspheric surface profiles of the second embodiment has the same form as that of the first embodiment.

In the second embodiment of the present image capturing lens system, the focal length of the system is f, and it satisfies the relation: f=3.04 (mm).

In the second embodiment of the present image capturing lens system, the f-number of the system is Fno, and it satisfies the relation: Fno=2.05.

In the second embodiment of the present image capturing lens system, half of the maximum field of view of the system is HFOV, and it satisfies the relation: HFOV=37.6 (degrees).

In the second embodiment of the present image capturing lens system, the Abbe number of the first lens element 210 is V1, the Abbe number of the second lens element 220 is V2, and they satisfy the relation: V2−V1=32.5.

In the second embodiment of the present image capturing lens system, the Abbe number of the third lens element 230 is V3, the Abbe number of the fourth lens element 240 is V4, and they satisfy the relation: V3−V4=32.5.

In the second embodiment of the present image capturing lens system, the focal length of the system is f, the focal length of the first lens element 210 is f1, and they satisfy the relation: f/f1=−0.15.

In the second embodiment of the present image capturing lens system, the focal length of the system is f, the focal length of the third lens element 230 is f3, and they satisfy the relation: f/f3=1.72.

In the second embodiment of the present image capturing lens system, the focal length of the third lens element 230 is f3, the focal length of the fourth lens element 240 is f4, and they satisfy the relation: f3/f4=−0.66.

In the second embodiment of the present image capturing lens system, the radius of curvature of the image-side surface of the second lens element 220 is R4, the focal length of the system is f, and they satisfy the relation: R4/f=−0.55.

In the second embodiment of the present image capturing lens system, the respective radii of curvature of the object-side and image-side surfaces of the third lens element 230 are R5 and R6, and they satisfy the relation: (R5+R6)/(R5−R6)=0.44.

In the second embodiment of the present image capturing lens system, the distance near the optical axis between the first lens element 210 and the second lens element 220 is T12, the focal length of the system is f, and they satisfy the relation: T12/f=0.93.

In the second embodiment of the present image capturing lens system, the distance near the optical axis between the third lens element 230 and the fourth lens element 240 is T34, the focal length of the system is f, and they satisfy the relation: (T34/f)*100=5.36.

In the second embodiment of the present image capturing lens system, an electronic photo sensor for image projection of an object is further provided at the image plane 270, the distance near the optical axis between the stop and the electronic photo sensor is SL, the distance near the optical axis between the object-side surface 211 of the first lens element 210 and the electronic photo sensor is TTL, and they satisfy the relation: SL/TTL=0.70.

In the second embodiment of the present image capturing lens system, an electronic photo sensor for image projection of an object is further provided at the image plane 270, the distance near the optical axis between the object-side surface 211 of the first lens element 210 and the electronic photo sensor is TTL, half of the diagonal length of the effective pixel area of the electronic photo sensor is ImgH, and they satisfy the relation: TTL/ImgH=4.50.

The detailed optical data of the second embodiment is shown in FIG. 8 (TABLE 3), and the aspheric surface data is shown in FIG. 9 (TABLE 4), wherein the units of the radius of curvature, the thickness and the focal length are expressed in mm, and HFOV is half of the maximum field of view.

Figure 3A:
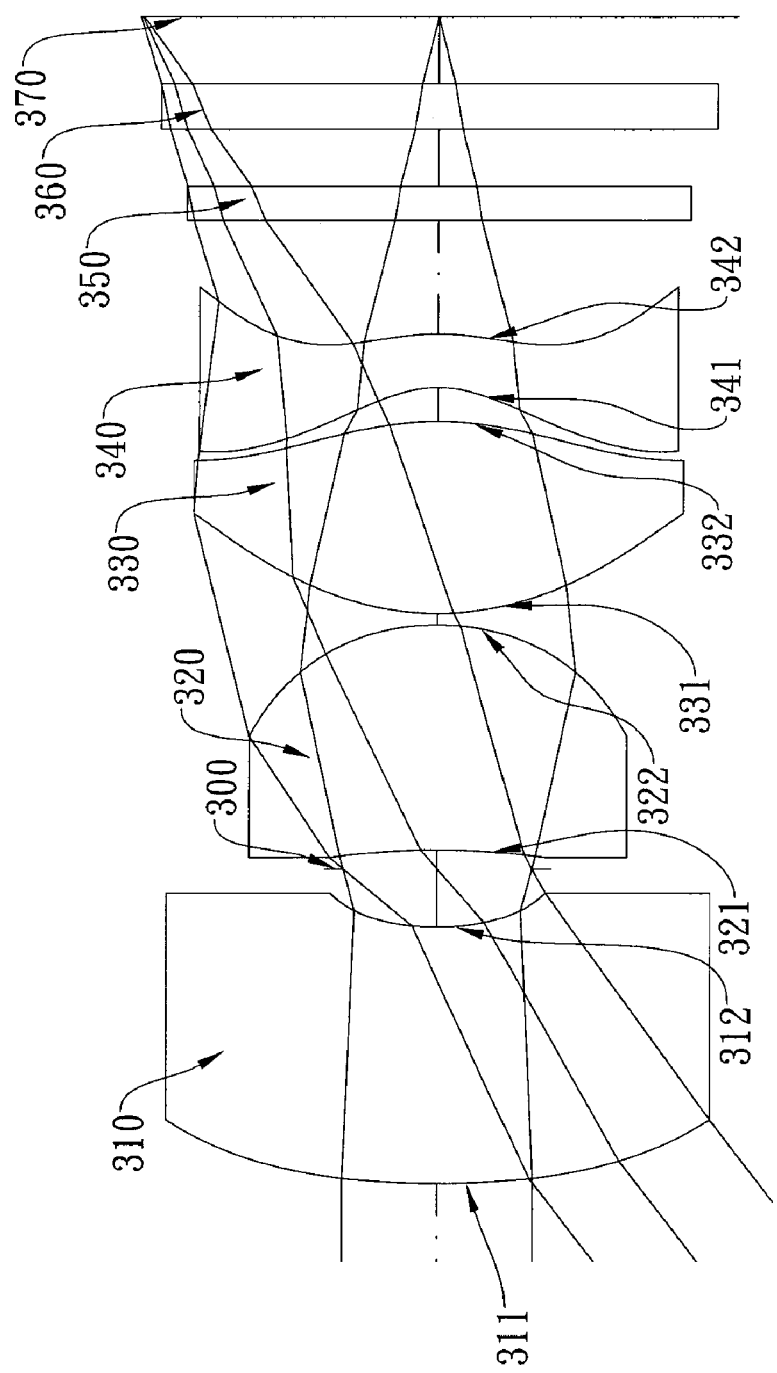
FIG. 3A shows an image capturing lens system in accordance with a third embodiment of the present invention.
Figure 3B:
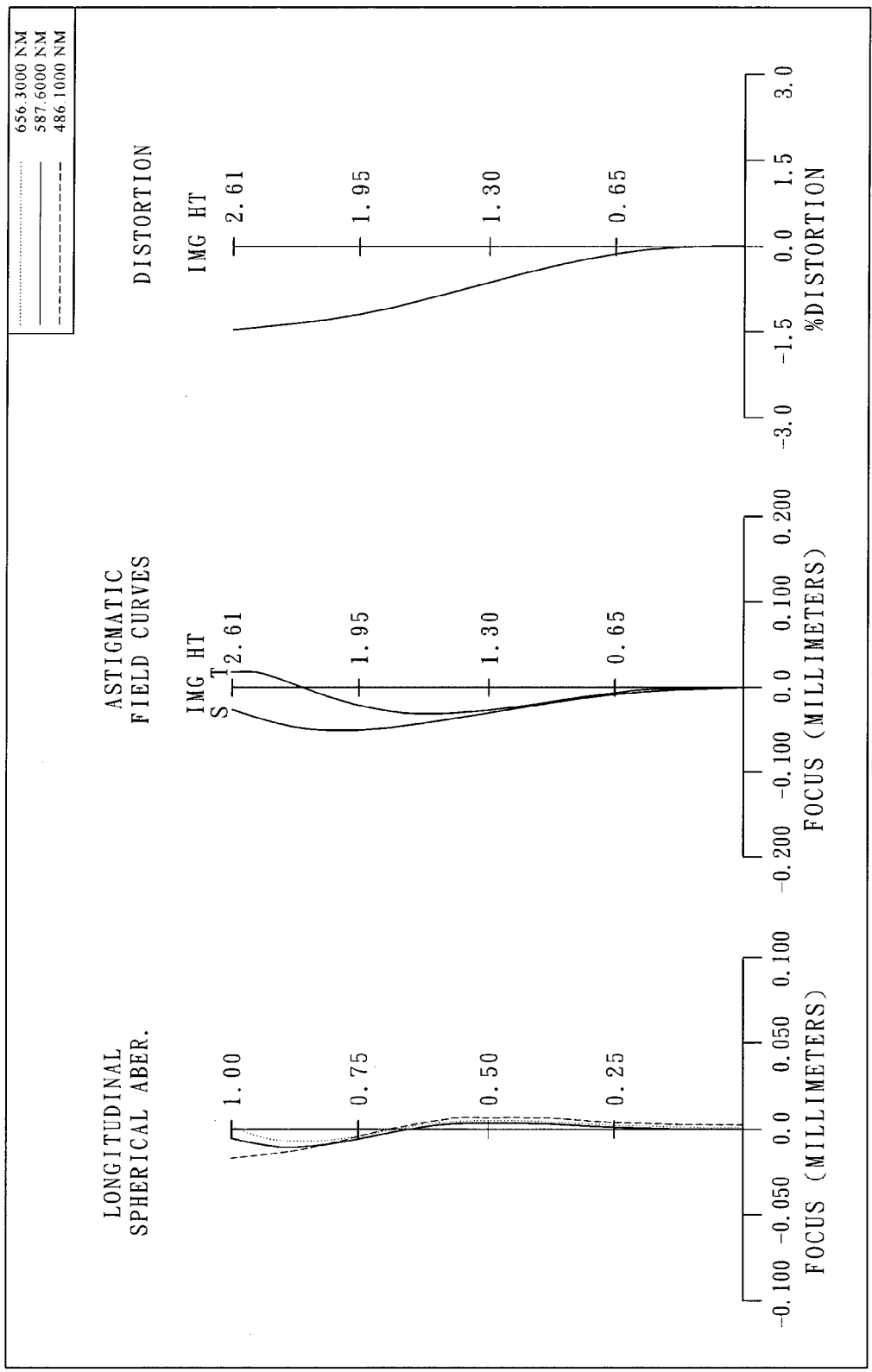
FIG. 3B shows the aberration curves of the third embodiment of the present invention.

FIG. 3A shows an image capturing lens system in accordance with a third embodiment of the present invention, and FIG. 3B shows the aberration curves of the third embodiment of the present invention. The image capturing lens system in the third embodiment mainly comprises four lens elements, in order from an object side to an image side: a plastic first lens element 310 with negative refractive power having a convex object-side surface 311 and a concave image-side surface 312, both of the surfaces 311 and 312 being aspheric; a plastic second lens element 320 with positive refractive power having a concave object-side surface 321 and a convex image-side surface 322, both of the surfaces 321 and 322 being aspheric; a plastic third lens element 330 with positive refractive power having convex object-side and image-side surfaces 331 and 332, both of the surfaces 331 and 332 being aspheric; a plastic fourth lens element 340 with negative refractive power having a concave object-side surface 341 and a convex image-side surface 342, both of the surfaces 341 and 342 being aspheric and having at least one inflection point respectively; and a stop 300 disposed between the first lens element 310 and the second lens element 320. The image capturing lens system further comprises a filter 350 and a cover glass 360 disposed between the image-side surface 342 of the fourth lens element 340 and an image plane 370; the filter 350 and the cover glass 360 are made of glass and have no influence on the focal length of the image capturing lens system.

The equation of the aspheric surface profiles of the third embodiment has the same form as that of the first embodiment.

In the third embodiment of the present image capturing lens system, the focal length of the system is f, and it satisfies the relation: f=3.47 (mm).

In the third embodiment of the present image capturing lens system, the f-number of the system is Fno, and it satisfies the relation: Fno=2.05.

In the third embodiment of the present image capturing lens system, half of the maximum field of view of the system is HFOV, and it satisfies the relation: HFOV=37.6 (degrees).

In the third embodiment of the present image capturing lens system, the Abbe number of the first lens element 310 is V1, the Abbe number of the second lens element 320 is V2, and they satisfy the relation: V2−V1=32.5.

In the third embodiment of the present image capturing lens system, the Abbe number of the third lens element 330 is V3, the Abbe number of the fourth lens element 340 is V4, and they satisfy the relation: V3−V4=32.5.

In the third embodiment of the present image capturing lens system, the focal length of the system is f, the focal length of the first lens element 310 is f1, and they satisfy the relation: f/f1=−0.58.

In the third embodiment of the present image capturing lens system, the focal length of the system is f, the focal length of the third lens element 330 is f3, and they satisfy the relation: f/f3=1.26.

In the third embodiment of the present image capturing lens system, the focal length of the third lens element 330 is f3, the focal length of the fourth lens element 340 is f4, and they satisfy the relation: f3/f4=−0.76.

In the third embodiment of the present image capturing lens system, the radius of curvature of the image-side surface of the second lens element 320 is R4, the focal length of the system is f, and they satisfy the relation: R4/f=−0.62.

In the third embodiment of the present image capturing lens system, the respective radii of curvature of the object-side and image-side surfaces of the third lens element 330 are R5 and R6, and they satisfy the relation: (R5+R6)/(R5−R6)=−0.05.

In the third embodiment of the present image capturing lens system, the distance near the optical axis between the first lens element 310 and the second lens element 320 is T12, the focal length of the system is f, and they satisfy the relation: T12/f=0.20.

In the third embodiment of the present image capturing lens system, the distance near the optical axis between the third lens element 330 and the fourth lens element 340 is T34, the focal length of the system is f, and they satisfy the relation: (T34/f)*100=8.65.

In the third embodiment of the present image capturing lens system, an electronic photo sensor for image projection of an object is further provided at the image plane 370, the distance near the optical axis between the stop and the electronic photo sensor is SL, the distance near the optical axis between the object-side surface 311 of the first lens element 310 and the electronic photo sensor is TTL, and they satisfy the relation: SL/TTL=0.72.

In the third embodiment of the present image capturing lens system, an electronic photo sensor for image projection of an object is further provided at the image plane 370, the distance near the optical axis between the object-side surface 311 of the first lens element 310 and the electronic photo sensor is TTL, half of the diagonal length of the effective pixel area of the electronic photo sensor is ImgH, and they satisfy the relation: TTL/ImgH=3.86.

The detailed optical data of the third embodiment is shown in FIG. 10 (TABLE 5), and the aspheric surface data is shown in FIG. 11 (TABLE 6), wherein the units of the radius of curvature, the thickness and the focal length are expressed in mm, and HFOV is half of the maximum field of view.

Figure 4A:
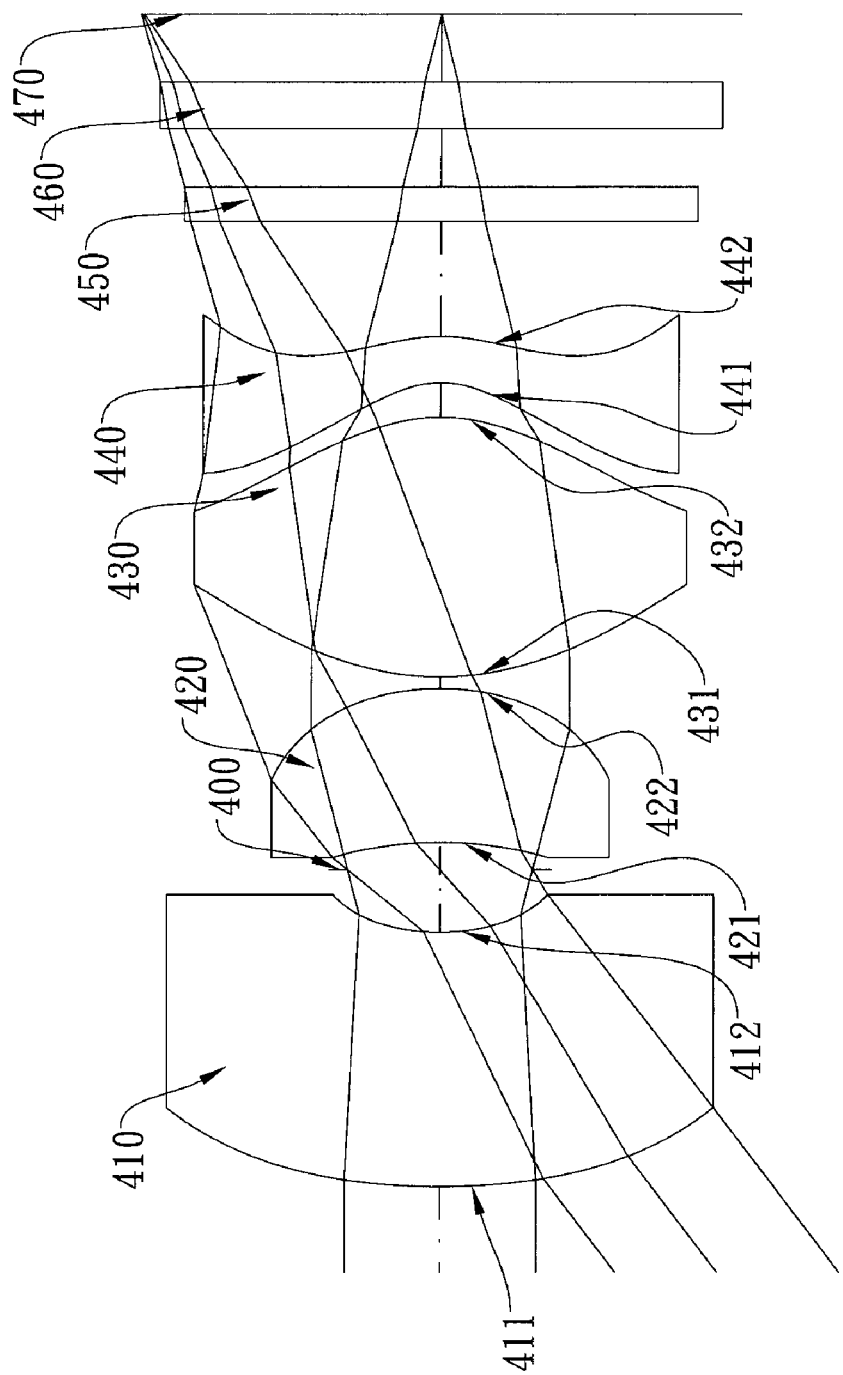
FIG. 4A shows an image capturing lens system in accordance with a fourth embodiment of the present invention.
Figure 4B:
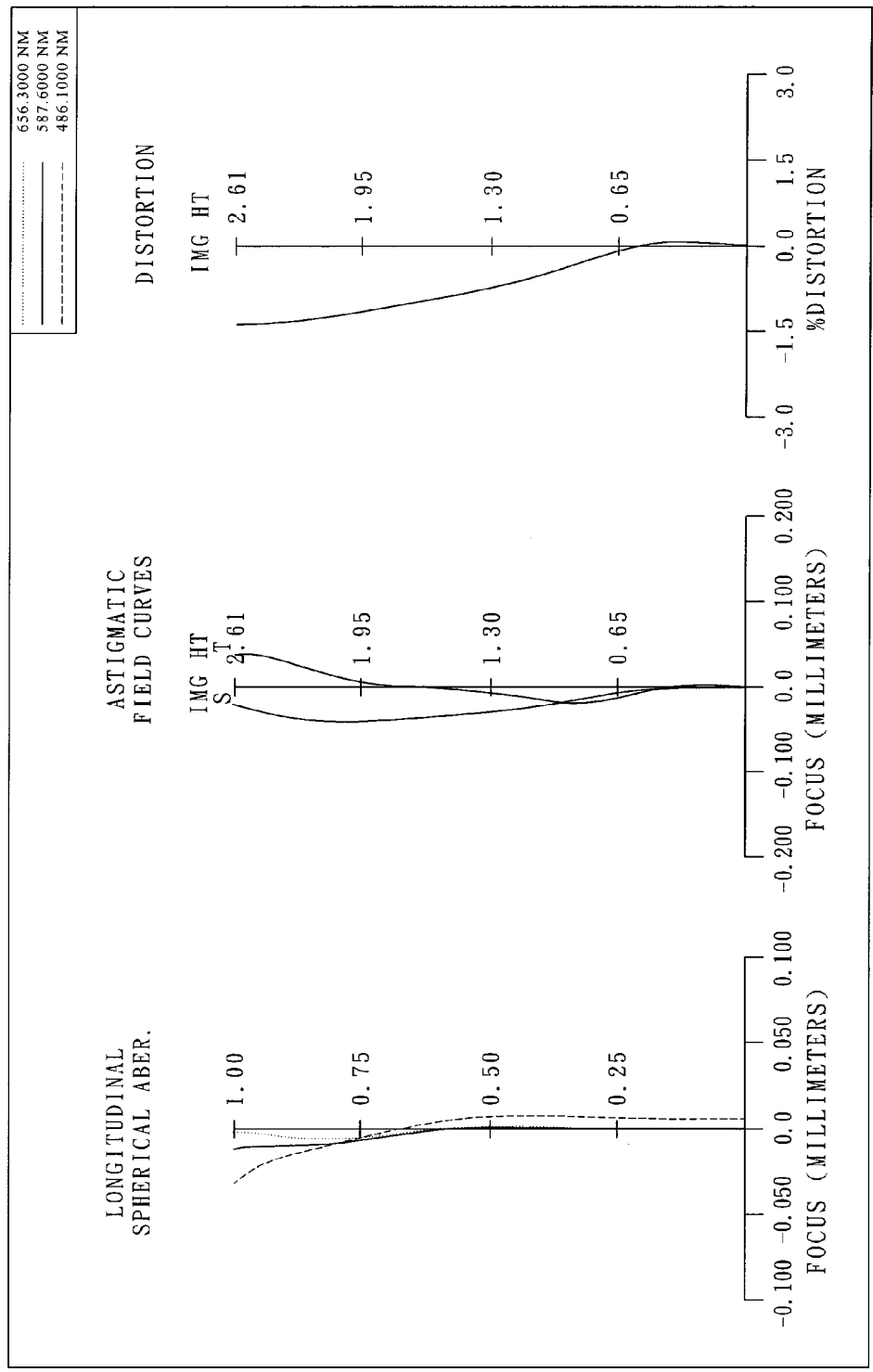
FIG. 4B shows the aberration curves of the fourth embodiment of the present invention.

FIG. 4A shows an image capturing lens system in accordance with a fourth embodiment of the present invention, and FIG. 4B shows the aberration curves of the fourth embodiment of the present invention. The image capturing lens system in the fourth embodiment mainly comprises four lens elements, in order from an object side to an image side: a plastic first lens element 410 with negative refractive power having a convex object-side surface 411 and a concave image-side surface 412, both of the surfaces 411 and 412 being aspheric; a plastic second lens element 420 with positive refractive power having a concave object-side surface 421 and a convex image-side surface 422, both of the surfaces 421 and 422 being aspheric; a plastic third lens element 430 with positive refractive power having convex object-side and image-side surfaces 431 and 432, both of the surfaces 431 and 432 being aspheric; a plastic fourth lens element 440 with negative refractive power having a concave object-side surface 441 and a convex image-side surface 442, both of the surfaces 441 and 442 being aspheric and having at least one inflection point respectively; and a stop 400 disposed between the first lens element 410 and the second lens element 420. The image capturing lens system further comprises a filter 450 and a cover glass 460 disposed between the image-side surface 442 of the fourth lens element 440 and an image plane 470; the filter 450 and the cover glass 460 are made of glass and have no influence on the focal length of the image capturing lens system.

The equation of the aspheric surface profiles of the fourth embodiment has the same form as that of the first embodiment.

In the fourth embodiment of the present image capturing lens system, the focal length of the system is f, and it satisfies the relation: f=3.46 (mm).

In the fourth embodiment of the present image capturing lens system, the f-number of the system is Fno, and it satisfies the relation: Fno=2.05.

In the fourth embodiment of the present image capturing lens system, half of the maximum field of view of the system is HFOV, and it satisfies the relation: HFOV=37.6 (degrees).

In the fourth embodiment of the present image capturing lens system, the Abbe number of the first lens element 410 is V1, the Abbe number of the second lens element 420 is V2, and they satisfy the relation: V2−V1=32.5.

In the fourth embodiment of the present image capturing lens system, the Abbe number of the third lens element 430 is V3, the Abbe number of the fourth lens element 440 is V4, and they satisfy the relation: V3−V4=32.5.

In the fourth embodiment of the present image capturing lens system, the focal length of the system is f, the focal length of the first lens element 410 is f1, and they satisfy the relation: f/f1=−0.59.

In the fourth embodiment of the present image capturing lens system, the focal length of the system is f, the focal length of the third lens element 430 is f3, and they satisfy the relation: f/f3=1.57.

In the fourth embodiment of the present image capturing lens system, the focal length of the third lens element 430 is f3, the focal length of the fourth lens element 440 is f4, and they satisfy the relation: f3/f4=−0.68.

In the fourth embodiment of the present image capturing lens system, the radius of curvature of the image-side surface of the second lens element 420 is R4, the focal length of the system is f, and they satisfy the relation: R4/f=−0.65.

In the fourth embodiment of the present image capturing lens system, the respective radii of curvature of the object-side and image-side surfaces of the third lens element 430 are R5 and R6, and they satisfy the relation: (R5+R6)/(R5−R6)=0.24.

In the fourth embodiment of the present image capturing lens system, the distance near the optical axis between the first lens element 410 and the second lens element 420 is T12, the focal length of the system is f, and they satisfy the relation: T12/f=0.23.

In the fourth embodiment of the present image capturing lens system, the distance near the optical axis between the third lens element 430 and the fourth lens element 440 is T34, the focal length of the system is f, and they satisfy the relation: (T34/f)*100=8.67.

In the fourth embodiment of the present image capturing lens system, an electronic photo sensor for image projection of an object is further provided at the image plane 470, the distance near the optical axis between the stop and the electronic photo sensor is SL, the distance near the optical axis between the object-side surface 411 of the first lens element 410 and the electronic photo sensor is TTL, and they satisfy the relation: SL/TTL=0.72.

In the fourth embodiment of the present image capturing lens system, an electronic photo sensor for image projection of an object is further provided at the image plane 470, the distance near the optical axis between the object-side surface 411 of the first lens element 410 and the electronic photo sensor is TTL, half of the diagonal length of the effective pixel area of the electronic photo sensor is ImgH, and they satisfy the relation: TTL/ImgH=3.81.

The detailed optical data of the fourth embodiment is shown in FIG. 12 (TABLE 7), and the aspheric surface data is shown in FIG. 13 (TABLE 8), wherein the units of the radius of curvature, the thickness and the focal length are expressed in mm, and HFOV is half of the maximum field of view.

Figure 5A:
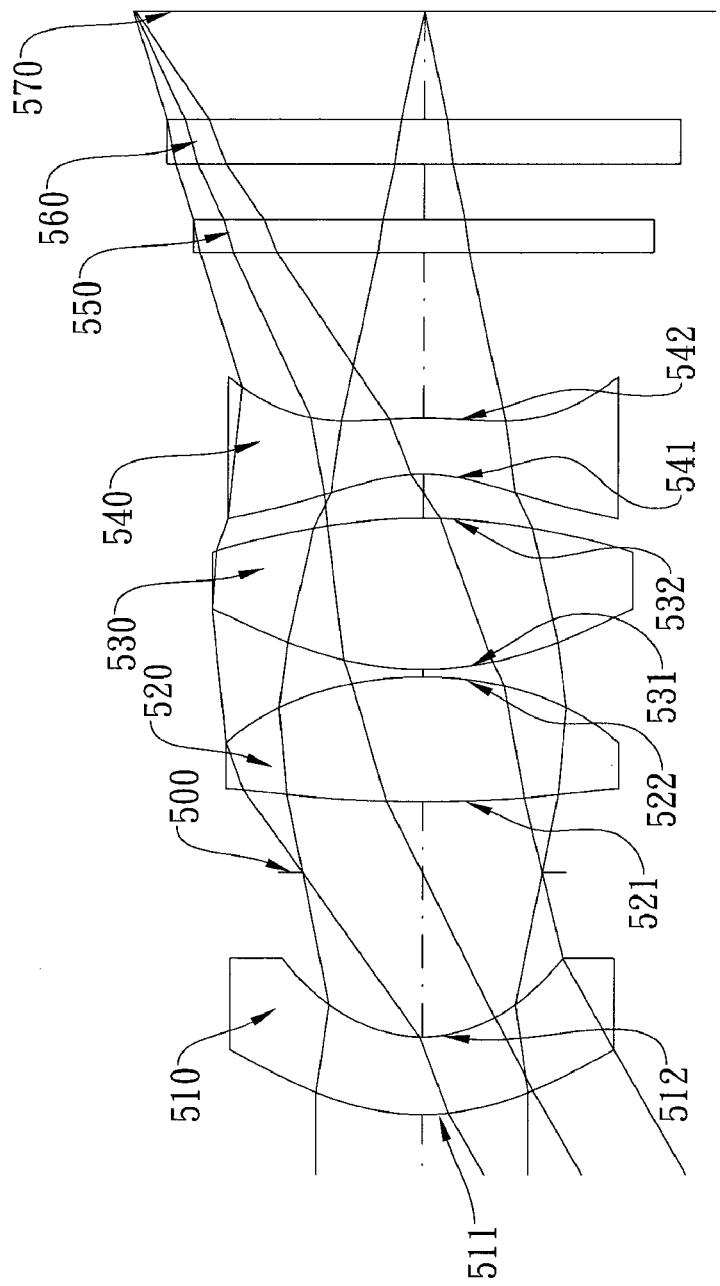
FIG. 5A shows an image capturing lens system in accordance with a fifth embodiment of the present invention.
Figure 5B:
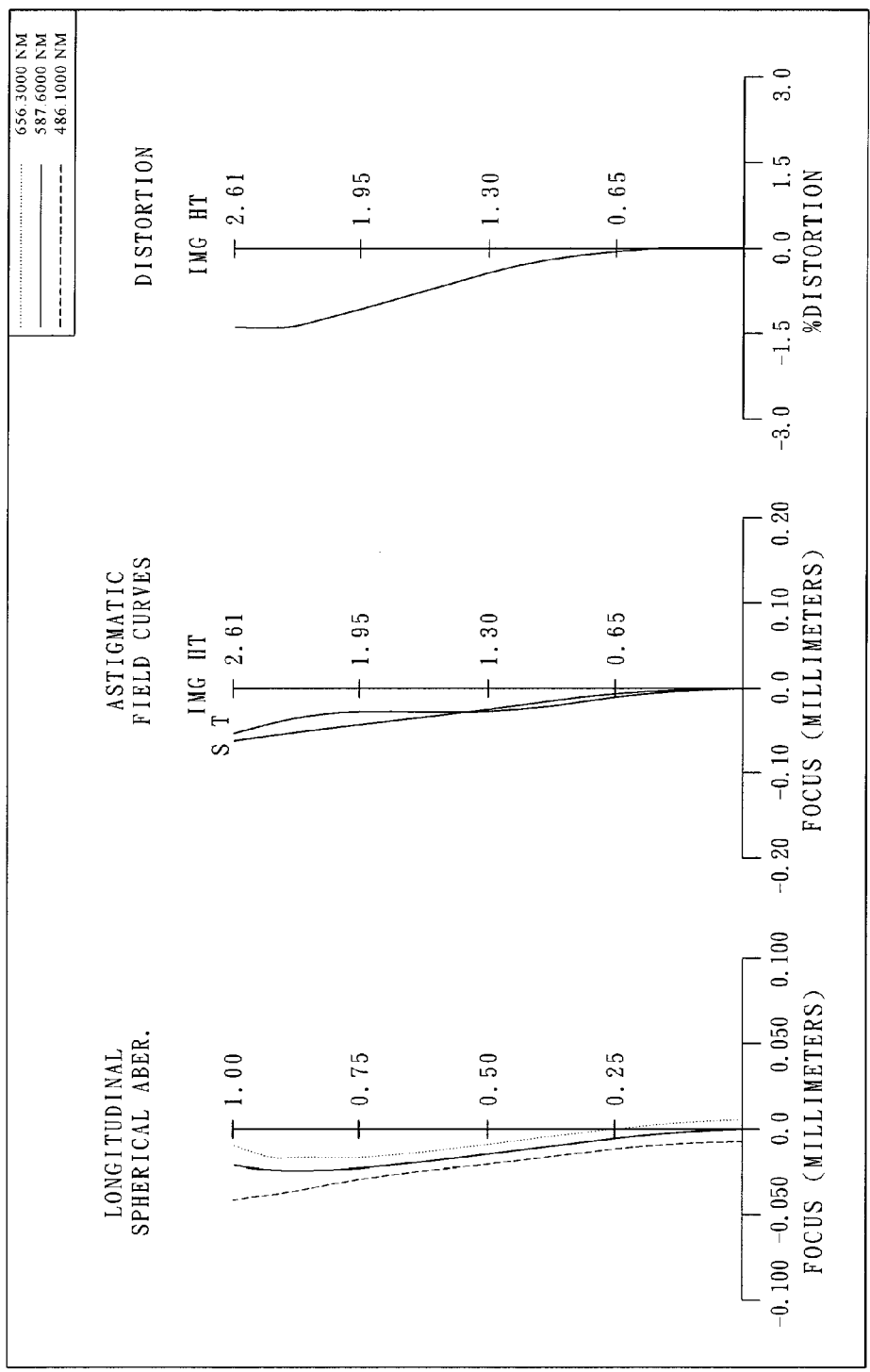
FIG. 5B shows the aberration curves of the fifth embodiment of the present invention.

FIG. 5A shows an image capturing lens system in accordance with a fifth embodiment of the present invention, and FIG. 5B shows the aberration curves of the fifth embodiment of the present invention. The image capturing lens system in the fifth embodiment mainly comprises four lens elements, in order from an object side to an image side: a plastic first lens element 510 with negative refractive power having a convex object-side surface 511 and a concave image-side surface 512, both of the surfaces 511 and 512 being aspheric; a plastic second lens element 520 with positive refractive power having convex object-side and image-side surfaces 521 and 522, both of the surfaces 521 and 522 being aspheric; a plastic third lens element 530 with positive refractive power having convex object-side and image-side surfaces 531 and 532, both of the surfaces 531 and 532 being aspheric; a plastic fourth lens element 540 with negative refractive power having a concave object-side surface 541 and a convex image-side surface 542, both of the surfaces 541 and 542 being aspheric and having at least one inflection point respectively; and a stop 500 disposed between the first lens element 510 and the second lens element 520. The image capturing lens system further comprises a filter 550 and a cover glass 560 disposed between the image-side surface 542 of the fourth lens element 540 and an image plane 570; the filter 550 and the cover glass 560 are made of glass and have no influence on the focal length of the image capturing lens system.

The equation of the aspheric surface profiles of the fifth embodiment has the same form as that of the first embodiment.

In the fifth embodiment of the present image capturing lens system, the focal length of the system is f, and it satisfies the relation: f=4.59 (mm).

In the fifth embodiment of the present image capturing lens system, the f-number of the system is Fno, and it satisfies the relation: Fno=2.40.

In the fifth embodiment of the present image capturing lens system, half of the maximum field of view of the system is HFOV, and it satisfies the relation: HFOV=30.1 (degrees).

In the fifth embodiment of the present image capturing lens system, the Abbe number of the first lens element 510 is V1, the Abbe number of the second lens element 520 is V2, and they satisfy the relation: V2−V1=25.7.

In the fifth embodiment of the present image capturing lens system, the Abbe number of the third lens element 530 is V3, the Abbe number of the fourth lens element 540 is V4, and they satisfy the relation: V3−V4=32.5.

In the fifth embodiment of the present image capturing lens system, the focal length of the system is f, the focal length of the first lens element 510 is f1, and they satisfy the relation: f/f1=−0.67.

In the fifth embodiment of the present image capturing lens system, the focal length of the system is f, the focal length of the third lens element 530 is f3, and they satisfy the relation: f/f3=1.25.

In the fifth embodiment of the present image capturing lens system, the focal length of the third lens element 530 is f3, the focal length of the fourth lens element 540 is f4, and they satisfy the relation: f3/f4=−0.91.

In the fifth embodiment of the present image capturing lens system, the radius of curvature of the image-side surface of the second lens element 520 is R4, the focal length of the system is f, and they satisfy the relation: R4/f=−0.77.

In the fifth embodiment of the present image capturing lens system, the respective radii of curvature of the object-side and image-side surfaces of the third lens element 530 are R5 and R6, and they satisfy the relation: (R5+R6)/(R5−R6)=−0.27.

In the fifth embodiment of the present image capturing lens system, the distance near the optical axis between the first lens element 510 and the second lens element 520 is T12, the focal length of the system is f, and they satisfy the relation: T12/f=0.46.

In the fifth embodiment of the present image capturing lens system, the distance near the optical axis between the third lens element 530 and the fourth lens element 540 is T34, the focal length of the system is f, and they satisfy the relation: (T34/f)*100=8.71.

In the fifth embodiment of the present image capturing lens system, an electronic photo sensor for image projection of an object is further provided at the image plane 570, the distance near the optical axis between the stop and the electronic photo sensor is SL, the distance near the optical axis between the object-side surface 511 of the first lens element 510 and the electronic photo sensor is TTL, and they satisfy the relation: SL/TTL=0.78.

In the fifth embodiment of the present image capturing lens system, an electronic photo sensor for image projection of an object is further provided at the image plane 570, the distance near the optical axis between the object-side surface 511 of the first lens element 510 and the electronic photo sensor is TTL, half of the diagonal length of the effective pixel area of the electronic photo sensor is ImgH, and they satisfy the relation: TTL/ImgH=3.74.

The detailed optical data of the fifth embodiment is shown in FIG. 14 (TABLE 9), and the aspheric surface data is shown in FIG. 15 (TABLE 10), wherein the units of the radius of curvature, the thickness and the focal length are expressed in mm, and HFOV is half of the maximum field of view.

It is to be noted that TABLES 1-10 (illustrated in FIGS. 6-15 respectively) show different data of the different embodiments; however, the data of the different embodiments are obtained from experiments. Therefore, any image capturing lens system of the same structure is considered to be within the scope of the present invention even if it uses different data. The preferred embodiments depicted above are exemplary and are not intended to limit the scope of the present invention. TABLE 11 (illustrated in FIG. 16) shows the data of the respective embodiments resulting from the equations.

What is claimed is:

1. An image capturing lens system comprising, in order from an object side to an image side:
   a first lens element with negative refractive power having a concave image-side surface;
   a second lens element with positive refractive power having a convex image-side surface;
   a third lens element with positive refractive power, at least one of the object-side and image-side surfaces thereof being aspheric;
   a fourth lens element with negative refractive power, both of the object-side and image-side surfaces thereof being aspheric; and
   a stop disposed between the first lens element and the third lens element,
   wherein there are four lens elements with refractive power, the radius of curvature of the image-side surface of the second lens element is R4, the focal length of the image capturing lens system is f, the distance near the optical axis between the third lens element and the fourth lens element is T34, and R4, f and T34 satisfy the following relations:

$-2.0 < R4/f < -0.2;$ $0.5 < (T34/f)*100 < 20.0.$

2. The image capturing lens system according to claim 1, wherein both of the object-side and image-side surfaces of the third lens element are convex and aspheric, and at least one of the object-side and image-side surfaces of the fourth lens element has at least one inflection point.

3. The image capturing lens system according to claim 2, wherein the first lens element has a convex object-side surface, and the fourth lens element has a concave object-side surface and a convex image-side surface.

4. The image capturing lens system according to claim 3, wherein at least three of the lens elements are made of plastic, and their object-side and image-side surfaces are both aspheric.

5. The image capturing lens system according to claim 1, wherein the focal length of the system is f, the focal length of the third lens element is f3, and f and f3 satisfy the following relation:

$0.80 < f/f3 < 2.40.$

6. The image capturing lens system according to claim 5, wherein the focal length of the system is f, the focal length of the third lens element is f3, and f and f3 satisfy the following relation:

$1.25 < f/f3 < 1.75.$

7. The image capturing lens system according to claim 4, wherein the focal length of the system is f, the focal length of the first lens element is f1, and f and f1 satisfy the following relation:

$-1.00 < f/f1 < -0.30.$

8. The image capturing lens system according to claim 4, wherein the Abbe number of the third lens element is V3, the Abbe number of the fourth lens element is V4, and V3 and V4 satisfy the following relation:

$23.0 < V3 - V4 < 46.0.$

9. The image capturing lens system according to claim 8, wherein the Abbe number of the third lens element is V3, the Abbe number of the fourth lens element is V4, and V3 and V4 satisfy the following relation:

$30.0 < V3 - V4 < 40.0.$

10. The image capturing lens system according to claim 9, wherein the Abbe number of the first lens element is V1, the Abbe number of the second lens element is V2, and V1 and V2 satisfy the following relation:

$30.0 < V2 - V1 < 40.0.$

11. The image capturing lens system according to claim 2, wherein the distance near the optical axis between the third lens element and the fourth lens element is T34, the focal length of the system is f, and T34 and f satisfy the following relation:

$4.0 < (T34/f)*100 < 12.0.$

12. The image capturing lens system according to claim 3, wherein the radius of curvature of the image-side surface of the second lens element is R4, the focal length of the system is f, and R4 and f satisfy the following relation:

$-1.0 < R4/f < -0.5.$

13. The image capturing lens system according to claim 2, wherein the stop is disposed between the first lens element and the second lens element, the system is further provided with an electronic photo sensor for image projection of an object, the distance near the optical axis between the stop and the electronic photo sensor is SL, the distance near the optical axis between the object-side surface of the first lens element and the electronic photo sensor is TTL, and SL and TTL satisfy the following relation:

$0.65 < SL/TTL < 0.90.$

14. The image capturing lens system according to claim 13, wherein the distance near the optical axis between the first lens element and the second lens element is T12, the focal length of the system is f, and T12 and f satisfy the following relation:

$0.05 < T12/f < 1.20.$

15. The image capturing lens system according to claim 14, wherein the distance near the optical axis between the first lens element and the second lens element is T12, the focal length of the system is f, and T12 and f satisfy the following relation:

$0.10 < T12/f < 0.50.$

16. The image capturing lens system according to claim 13, wherein the focal length of the third lens element is f3, the focal length of the fourth lens element is f4, and f3 and f4 satisfy the following relation:

$-1.00 < f3/f4 < -0.50.$

17. The image capturing lens system according to claim 1, wherein the respective radii of curvature of the object-side and image-side surfaces of the third lens element are R5 and R6, and they satisfy the following relation:

$-0.50 < (R5+R6)/(R5-R6) < 0.70.$

18. The image capturing lens system according to claim 1, wherein the system is further provided with an electronic photo sensor for image projection of an object, the distance near the optical axis between the object-side surface of the first lens element and the electronic photo sensor is TTL, half of the diagonal length of the effective pixel area of the electronic photo sensor is ImgH, and TTL and ImgH satisfy the following relation:

*TTL/ImgH<5.0.*

19. An image capturing lens system comprising, in order from an object side to an image side:
   a first lens element with negative refractive power having a convex object-side surface and a concave image-side surface;
   a second lens element with positive refractive power having a convex image-side surface;
   a third lens element with positive refractive power, at least one of the object-side and image-side surfaces thereof being aspheric;
   a fourth lens element with negative refractive power, at least one of the object-side and image-side surfaces thereof having at least one inflection point; and
   a stop disposed between the first lens element and the second lens element,
   wherein there are four lens elements with refractive power, the focal length of the image capturing lens system is f, the focal length of the third lens element is f3, the distance near the optical axis between the third lens element and the fourth lens element is T34, and f, f3 and T34 satisfy the following relations:

$0.80<f/f3<2.40;$ $0.5<(T34/f)*100<20.0.$

20. The image capturing lens system according to claim 19, wherein the fourth lens element has a concave object-side surface and a convex image-side surface, both of the object-side and image-side surfaces of the third lens element are aspheric, and both of the object-side and image-side surfaces of the fourth lens element are aspheric.

21. The image capturing lens system according to claim 20, wherein at least three of the lens elements are made of plastic, and their object-side and image-side surfaces are both aspheric.

22. The image capturing lens system according to claim 20, wherein the focal length of the system is f, the focal length of the third lens element is f3, and f and f3 satisfy the following relation:

$1.25<f/f3<1.75.$

23. The image capturing lens system according to claim 19, wherein the distance near the optical axis between the first lens element and the second lens element is T12, the focal length of the system is f, and T12 and f satisfy the following relation:

$0.10<T12/f<0.50.$

24. The image capturing lens system according to claim 19, wherein the Abbe number of the first lens element is V1, the Abbe number of the second lens element is V2, the Abbe number of the third lens element is V3, the Abbe number of the fourth lens element is V4, and V1, V2, V3 and V4 satisfy the following relations:

$30.0<V2-V1<40.0;$ $30.0<V3-V4<40.0.$

25. The image capturing lens system according to claim 21, wherein the respective radii of curvature of the object-side and image-side surfaces of the third lens element are R5 and R6, and they satisfy the following relation:

$-0.50<(R5+R6)/(R5-R6)<0.70.$

* * * * *